United States Patent
Perkins et al.

(10) Patent No.: US 9,545,849 B2
(45) Date of Patent: Jan. 17, 2017

(54) VEHICLE SYSTEM AND METHOD FOR ADAPTING LIFT PEDAL REGENERATION

(71) Applicant: FORD GLOBAL TECHNOLOGIES, LLC, Dearborn, MI (US)

(72) Inventors: William Paul Perkins, Dearborn, MI (US); Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 14/491,062

(22) Filed: Sep. 19, 2014

(65) Prior Publication Data

US 2016/0082842 A1    Mar. 24, 2016

(51) Int. Cl.
| | | |
|---|---|---|
| *B60L 9/00* | (2006.01) | |
| *B60L 7/18* | (2006.01) | |
| *B60T 8/172* | (2006.01) | |
| *B60T 1/10* | (2006.01) | |
| *B60T 8/88* | (2006.01) | |

(52) U.S. Cl.
CPC .. *B60L 7/18* (2013.01); *B60T 1/10* (2013.01); *B60T 8/172* (2013.01); *B60T 8/885* (2013.01); *B60T 2220/02* (2013.01)

(58) Field of Classification Search
CPC ................................ G05D 17/00; G06F 19/00
USPC ............. 701/22; 180/65.21, 65.285; 903/903
See application file for complete search history.

(56) References Cited

U.S. PATENT DOCUMENTS

| | | | |
|---|---|---|---|
| 5,343,970 A | 9/1994 | Severinsky | |
| 5,615,933 A | 4/1997 | Kidston et al. | |
| 2011/0320074 A1 | 12/2011 | Eriston et al. | |
| 2012/0109441 A1* | 5/2012 | Vespasien | 701/22 |
| 2013/0073113 A1* | 3/2013 | Wang et al. | 701/1 |

FOREIGN PATENT DOCUMENTS

WO    2014058383 A2    4/2014

* cited by examiner

*Primary Examiner* — Thomas G Black
*Assistant Examiner* — Luke Huynh
(74) *Attorney, Agent, or Firm* — Carlson, Gaskey & Olds (57) ABSTRACT

A method according to an exemplary aspect of the present disclosure includes, among other things, controlling an electrified vehicle by increasing lift pedal regeneration in response to exceeding a system regeneration limit.

18 Claims, 4 Drawing Sheets

VEHICLE SYSTEM AND METHOD FOR ADAPTING LIFT PEDAL REGENERATION

TECHNICAL FIELD

This disclosure relates to a vehicle system and method associated with an electrified vehicle. The vehicle system is configured to adapt lift pedal regeneration of the electrified vehicle in response to exceeding a system regeneration limit.

BACKGROUND

The need to reduce fuel consumption and emissions in automobiles and other vehicles is well known. Therefore, vehicles are being developed that reduce or completely eliminate reliance on internal combustion engines. Electrified vehicles are one type of vehicle currently being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

It is known to use an electric machine to decelerate an electrified vehicle. This is commonly referred to as regenerative braking. Regenerative braking can be achieved during braking or lift pedal conditions by configuring the electric machine as a generator. The act of generating power with the electric machine creates a negative braking torque, or regenerative torque, on the electric machine. The negative torque is transmitted to the drive wheels to slow the electrified vehicle.

Drivers of electrified vehicles can apply a brake pedal so abruptly or assertively that a system regeneration limit is exceeded, thereby forcing friction brakes of the vehicle to apply the decelerative wheel torque. If braking is too aggressive, regeneration energy is lost to the vehicle friction brakes, which may reduce fuel economy.

SUMMARY

A method according to an exemplary aspect of the present disclosure includes, among other things, controlling an electrified vehicle by increasing lift pedal regeneration in response to exceeding a system regeneration limit.

In a further non-limiting embodiment of the foregoing method, the controlling step includes incrementally increasing the lift pedal regeneration each time the system regeneration limit is exceeded.

In a further non-limiting embodiment of either of the foregoing methods, the step of incrementally increasing the lift pedal regeneration includes increasing the lift pedal regeneration by a predefined amount each time the system regeneration limit is exceeded.

In a further non-limiting embodiment of any of the foregoing methods, the controlling step includes incrementally increasing or decreasing the lift pedal regeneration if driver braking behavior meets a predefined criteria.

In a further non-limiting embodiment of any of the foregoing methods, the predefined criteria includes whether friction brakes of the electrified vehicle have been applied during a predefined number of key cycles.

In a further non-limiting embodiment of any of the foregoing methods, the predefined criteria includes whether the system regeneration limit has been exceeded during a predefined amount of time or predefined number of braking events.

In a further non-limiting embodiment of any of the foregoing methods, the controlling step includes monitoring a braking event and determining whether the system regeneration limit was exceeded during the braking event.

In a further non-limiting embodiment of any of the foregoing methods, the determining step includes determining whether friction brakes of the electrified vehicle were applied during the braking event.

In a further non-limiting embodiment of any of the foregoing methods, the controlling step includes increasing the lift pedal regeneration only if the increased lift pedal regeneration does not exceed a predefined maximum lift pedal regeneration.

In a further non-limiting embodiment of any of the foregoing methods, the method includes decelerating the electrified vehicle based on the increased lift pedal regeneration during a subsequent lift pedal event.

In a further non-limiting embodiment of any of the foregoing methods, the method includes decelerating the electrified vehicle at a first deceleration rate in response to a first lift pedal event and decelerating the electrified vehicle at a second deceleration rate that is greater than the first deceleration rate during a second lift pedal event in response to exceeding the system regeneration limit of the electrified vehicle during the first lift pedal event.

In a further non-limiting embodiment of any of the foregoing methods, the method includes commanding a torque command signal that is derived from the increased lift pedal regeneration to an electric machine to decelerate the electrified vehicle at a desired deceleration rate during a subsequent lift pedal event.

In a further non-limiting embodiment of any of the foregoing methods, the controlling step includes decreasing the lift pedal regeneration if the system regeneration limit was not exceeded during a predefined amount of time prior to the decreasing step.

In a further non-limiting embodiment of any of the foregoing methods, the method includes determining a location of the electrified vehicle and determining whether the system regeneration limit was previously exceeded at the location.

In a further non-limiting embodiment of any of the foregoing methods, the method includes performing the controlling step if the system regeneration limit was previously exceeded at the location.

A vehicle system according to another exemplary aspect of the present disclosure includes, among other things, an electric machine and a control module in communication with the electric machine and configured to increase a negative torque demand commanded to the electric machine in response to exceeding a system regeneration limit during a braking event of the vehicle system.

In a further non-limiting embodiment of the foregoing vehicle system, an accelerator pedal communicates a pedal position signal to the control module.

In a further non-limiting embodiment of either of the foregoing vehicle systems, a brake pedal communicates a pedal position signal to the control module.

In a further non-limiting embodiment of any of the foregoing vehicle systems, the negative torque demand is derived from a power calculation associated with lift pedal regeneration.

In a further non-limiting embodiment of any of the foregoing vehicle systems, the control module is configured to decrease the negative torque demand commanded to the electric machine if the system regeneration limit is not exceeded during the braking event and a driver braking behavior meets a predefined criteria.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a vehicle system and method for adapting lift pedal regeneration during certain driving events. For example, the vehicle system may adapt lift pedal regeneration in response to exceeding a system regeneration limit, or the maximum amount of power that can be recaptured by the vehicle during a given amount of time. The lift pedal regeneration can be incrementally increased each time the system regeneration limit has been exceeded. Conversely, the lift pedal regeneration can be incrementally decreased during other conditions, such as when acceptable braking behavior has been observed. These and other features are discussed in greater detail in the paragraphs that follow.

Figure 1:
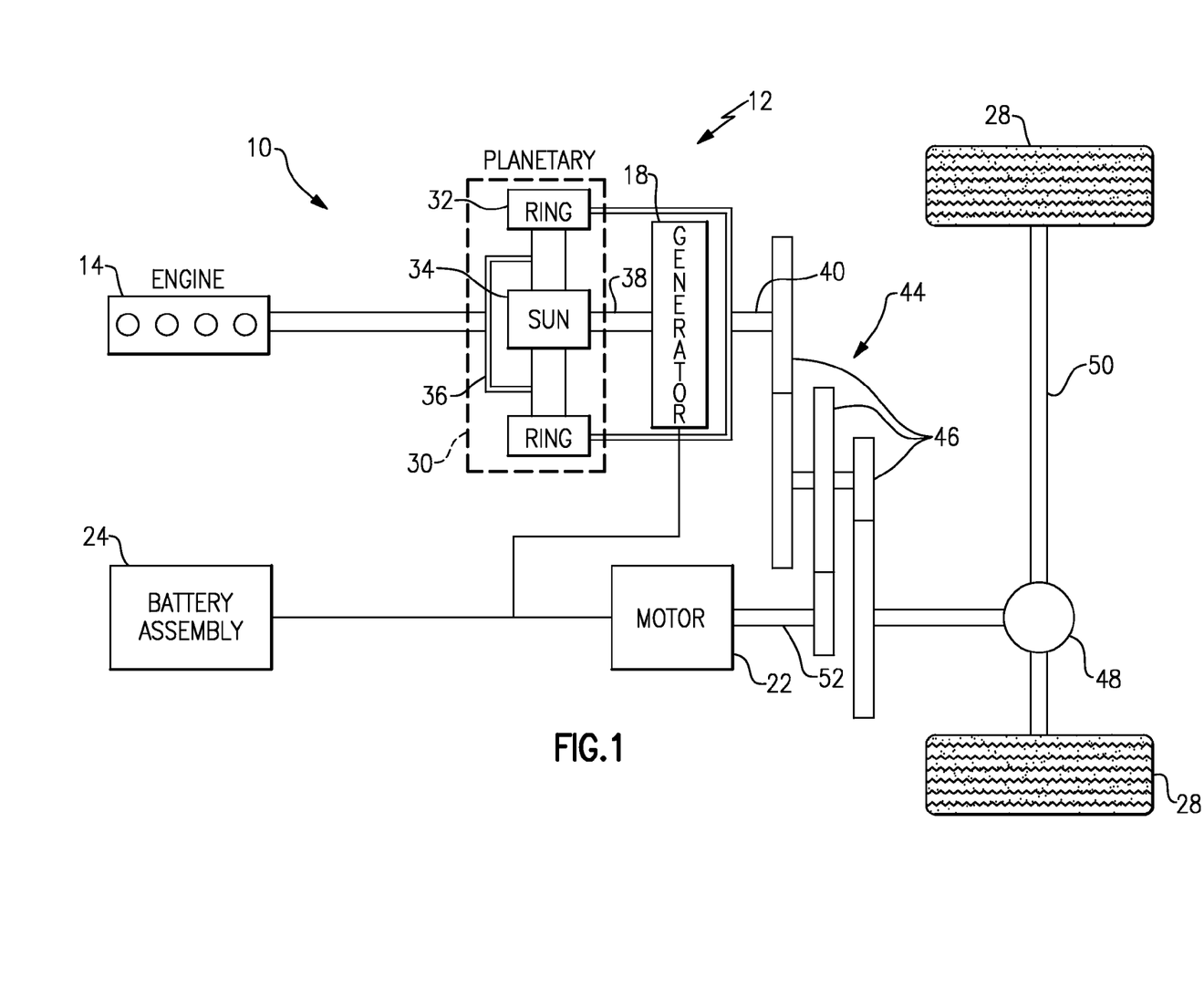
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), and modular hybrid transmission vehicles (MHT's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which could include an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary type of electrified vehicle battery assembly. The battery assembly 24 may include a high voltage battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
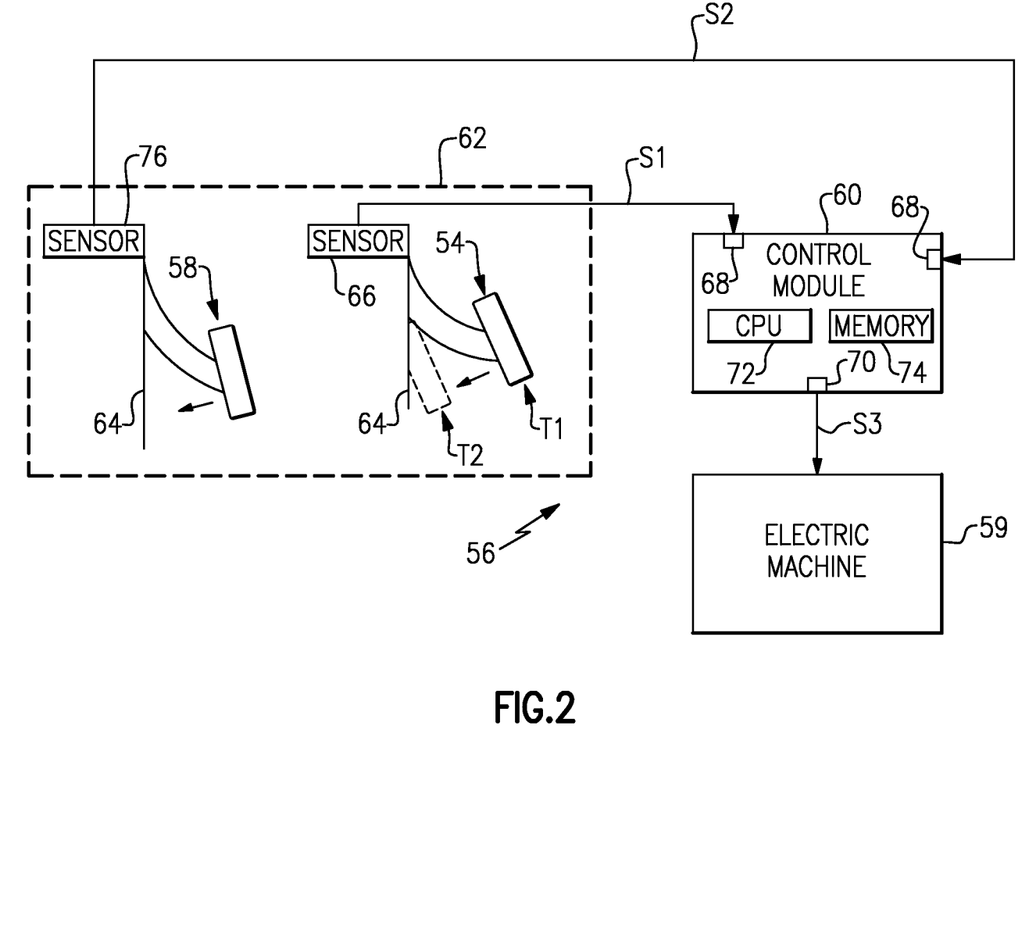
FIG. 2 illustrates a vehicle system of an electrified vehicle.

FIG. 2 illustrates a vehicle system 56 that may be incorporated into a vehicle, such as the electrified vehicle 12 of FIG. 1. The vehicle system 56 is adapted to adjust an amount of lift pedal regeneration that is utilized to decelerate an electrified vehicle during certain driving conditions, such as in response to exceeding a system regeneration limit In this disclosure, the term "lift pedal regeneration" refers to the act of generating power with an electric machine to create a negative torque for decelerating the electrified vehicle and storing the collected energy in a high voltage battery when a driver releases an accelerator pedal. Also, the term "system regeneration limit" refers to the maximum amount of power/current/voltage or other similar unit of measurement that can be recaptured by the components of the vehicle system 56 in a given amount of time during a period of lift pedal regeneration.

In one non-limiting embodiment, the exemplary vehicle system 56 includes an accelerator pedal 54, a brake pedal 58, an electric machine 59, and a control module 60. The accelerator pedal 54 may be located within a passenger compartment 62 (shown schematically) onboard an electrified vehicle. The accelerator pedal 54 may be actuated by a driver to request a torque, power or drive command for propelling or decelerating the vehicle. The accelerator pedal 54 may be positioned at a plurality of accelerator pedal positions between fully tipped out (shown as position T1, also called lift pedal) and tip in (shown as position T2). For example, at a 0% pedal position, the accelerator pedal 54 is completely tipped out (i.e., driver's foot has been removed from the accelerator pedal 54), and at a 100% pedal position the accelerator pedal 54 is completely tipped in (i.e., driver's foot has depressed the accelerator pedal 54 down to a floor board 64 of the passenger compartment 62). The vehicle system 56 may command lift pedal regeneration when the accelerator pedal 54 is in position T1.

The accelerator pedal 54 may be an electronic device that includes a sensor 66 for indicating the accelerator pedal position during vehicle operation. In general, the sensor 66 may generate a pedal position signal S1 that is communicated to the control module 60 as the accelerator pedal 54 is depressed and/or released.

The brake pedal 58 may also be located within the passenger compartment 62. The brake pedal 58 may be actuated by the driver to decelerate the vehicle. The brake pedal 58 may be depressed toward the floor board 64 to activate regenerative braking and/or to activate friction brakes of the electrified vehicle (not shown). In one embodiment, the brake pedal 58 is an electronic device that includes a sensor 76 for indicating a pedal position when the brake pedal 58 is actuated. The sensor 76 may generate a pedal position signal S2 that is communicated to the control module 60 as pressure is applied to the brake pedal 58. The pedal position signal S2 may be indicative of an amount of pressure applied to the brake pedal 58.

The electric machine 59 may be configured as an electric motor, a generator or a combined electric motor/generator. Based at least upon input from the accelerator pedal 54 via the pedal position signal S1 and the brake pedal 58 via the pedal position signal S2, the control module 60 may command torque (either positive torque or negative torque) from the electric machine 59 for generating power. For example, the electric machine 59 may receive torque command signals S3 from the control module 60 for propelling the electrified vehicle or for decelerating the electrified vehicle during periods of lift pedal regeneration. In some driving situations, such as aggressive braking conditions, the control module 60 may additionally or alternatively apply the friction brakes (not shown) to decelerate the vehicle.

While schematically illustrated as a single module in the illustrated embodiment, the control module 60 of the vehicle system 56 may be part of a larger control system and may be controlled by various other controllers throughout an electrified vehicle, such as a vehicle system controller (VSC) that includes a powertrain control unit, a transmission control unit, an engine control unit, a battery electronic control module (BECM), etc. It should therefore be understood that the control module 60 and one or more other controllers can be collectively referred to as "a control module" that controls, such as through a plurality of integrated algorithms, various actuators in response to signals from various sensors to control functions associated with the electrified vehicle, and in this case, with the vehicle system 56. The various controllers that make up the VSC can communicate with one another using a common bus protocol (e.g., CAN).

In one embodiment, the control module 60 includes executable instructions for interfacing with and operating various components of the vehicle system 56. The control module 60 may include inputs 68 and outputs 70 for interfacing with the components of the vehicle system 56. The control module 60 may additionally include a central processing unit 72 and non-transitory memory 74 for executing the various control strategies and modes of the vehicle system 56.

In one embodiment, the control module 60 is configured to monitor braking events of the electrified vehicle and increase an amount of lift pedal regeneration if the regenerative power limit is exceeded during the braking event. A desired deceleration rate associated with the lift pedal regeneration may be calculated based at least on the pedal position signal Si and the pedal position signal S2. The control module 60 may communicate a torque command signal S3 to the electric machine 59 for achieving the desired deceleration rate during the lift pedal event.

Figure 3:
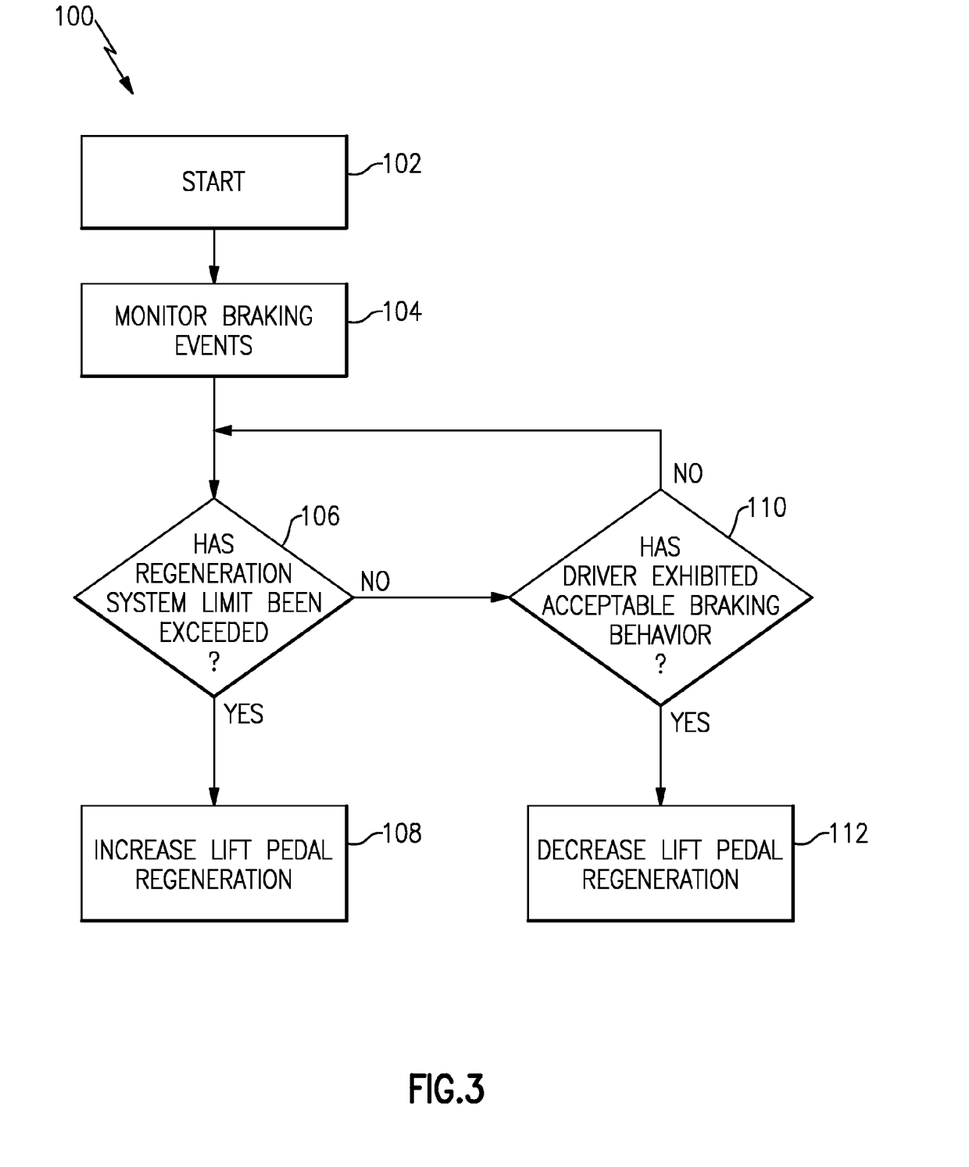
FIG. 3 schematically illustrates a vehicle control strategy for adapting lift pedal regeneration of an electrified vehicle in response to exceeding a system regeneration limit.

FIG. 3, with continued reference to FIGS. 1-2, schematically illustrates a vehicle control strategy 100 of an electrified vehicle 12 equipped with the vehicle system 56 described above. The exemplary vehicle control strategy 100 may be performed to adapt lift pedal regeneration of the electrified vehicle 12 during certain driving events. For example, lift pedal generation may be increased in response to exceeding a system regeneration limit of the electrified vehicle 12 during a braking event. Of course, the vehicle system 56 is capable of implementing and executing other control strategies within the scope of this disclosure. In one embodiment, the control module 60 of the vehicle system 56 may be programmed with one or more algorithms adapted to execute the vehicle control strategy 100, or any other control strategy. In other words, in one non-limiting embodiment, the vehicle control strategy may be stored as executable instructions in a non-transitory memory 74 of the control module 60.

As shown in FIG. 3, the vehicle control strategy 100 begins at block 102. At block 104, the vehicle system 56 monitors braking events of the electrified vehicle 12. A braking event occurs when the brake pedal 58 is actuated by a driver. This would also coincide with a lift pedal event in which the driver releases pressure on the accelerator pedal 54 (i.e., moves the accelerator pedal 54 to position T1 of FIG. 2). The control module 60 of the vehicle system 56 may monitor the braking events based on pedal position signals S1, S2 from the sensors 66, 76.

At block 106, the vehicle control strategy 100 determines whether a system regeneration limit of the electrified vehicle 12 has been exceeded during each braking event. In one embodiment, the vehicle system 56 determines whether or not the system regeneration limit was exceeded by determining whether friction brakes were used to decelerate the electrified vehicle 12 during the braking event. This determination can be made by calculating whether the braking power demand (derived from the pedal position signal S2) exceeds the regenerative power limit If the difference between the braking power demand and the regenerative power limit exceeds zero, then the friction brakes have been applied to decelerate the electrified vehicle 12. Stated another way, if the friction brakes were used to decelerate the electrified vehicle 12, then the vehicle control strategy 100 can conclude that the regenerative power limit was exceeded.

If the system regeneration limit has been exceeded, the vehicle control strategy 100 proceeds to block 108 and commands increased lift pedal regeneration for the next lift pedal event. In one embodiment, the lift pedal regeneration, which includes an associated power calculation generated by the electric machine 59, is incrementally increased in response to exceeding the system regeneration limit. The lift pedal regeneration can be increased by a predefined percentage amount, which is in one example a 1% increase, although other incremental increases are also contemplated. The control module 60 may communicate a torque command signal S3 to the electric machine 59 for achieving a desired deceleration rate that is derived from the power calculation associated with the increased lift pedal regeneration to decelerate the electrified vehicle 12.

In another embodiment, the vehicle control strategy 100 can also control how much the lift pedal regeneration is incrementally increased, which may vary from one lift pedal event to the next. The amount of change may be a function of an amount that the system regeneration limit has been exceeded. Various factors may influence this calculation, including but not limited to, brake torque, wheel speed, motor torque, motor speed, driveline losses and other parasitic power losses.

The vehicle control strategy 100 may be adapted to increase the lift pedal regeneration at block 108 only if such an increase would not exceed a predefined maximum lift pedal regeneration. The predefined maximum lift pedal regeneration may be a value stored in the non-transitory memory 74 of the control module 60, such as in a look-up table, for comparison to the increased lift pedal regeneration calculated at block 108.

In one embodiment, the electrified vehicle 12 is decelerated at a first deceleration rate prior to block 108 (i.e., in response to a first lift pedal event), and may be decelerated at a second deceleration rate that is greater than the first deceleration rate in response to a second lift pedal event that occurs after block 108. Stated another way, the first lift pedal event occurs prior to exceeding the system regeneration limit and the second lift pedal event occurs after exceeding the system regeneration limit. The electrified vehicle 12 is therefore decelerated more assertively subsequent to exceeding a system regeneration limit.

Alternatively, if the system regeneration limit is not exceeded at block 106, the vehicle control strategy 100 may proceed to block 110. The vehicle control strategy 100 may determine whether the driver of the electrified vehicle 12 has exhibited acceptable braking behavior at block 110. For example, the vehicle control strategy 100 may be adapted to compare the driver's braking behavior to one or more predefined criteria. In one embodiment, the predefined criteria includes whether the friction brakes of the electrified vehicle 12 were applied during a predefined number of previous key cycles. In another embodiment, the predefined criteria may include a predefined amount of time or number of braking events for which the system regeneration limit has not been exceeded.

The vehicle control strategy 100 proceeds to block 112 if the driver's braking behavior meets the predefined criteria during the comparison of block 110. The lift pedal regeneration may then be decreased, or unwound, at block 112. The lift pedal regeneration can be decreased by a predefined percentage amount, which is in one example, a 1% decrease, although other incremental decreased amounts are also contemplated. The control module 60 may communicate a torque command signal S3 to the electric machine 59 that is derived from the power calculation associated with the decreased lift pedal regeneration value to decelerate the electrified vehicle 12 at a different deceleration rate during a subsequent lift pedal condition.

In another embodiment, the vehicle control strategy 100 may be adapted to decrease the lift pedal regeneration at block 112 only if such a decrease would not exceed a predefined minimum lift pedal regeneration. The predefined minimum lift pedal regeneration may be a value stored in the non-transitory memory 74 of the control module 60, such as in a look-up table, for comparison to the decreased lift pedal regeneration calculated at block 112.

In another embodiment, the lift pedal regeneration may be increased in response to predefined criteria associated with the driver's braking behavior. For example, the control module 60 may ignore the first few times the system regeneration limit is exceeded and then begin to increase the lift pedal regeneration in response to subsequently exceeding system regeneration limits.

Figure 4:
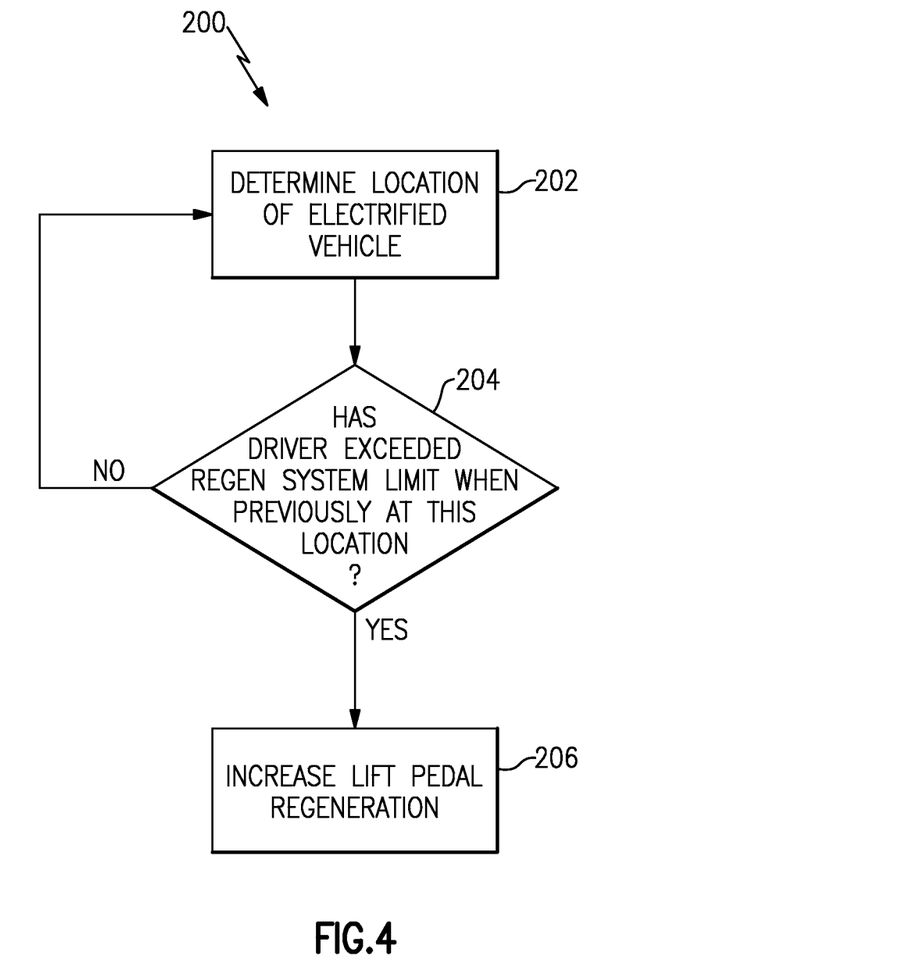
FIG. 4 schematically illustrates a vehicle control strategy according to another embodiment of this disclosure.

FIG. 4 illustrates another exemplary vehicle control strategy 200 that can be implemented and executed by the vehicle system 56. First, a location of the electrified vehicle 12 may be determined at block 202. In one embodiment, the vehicle system 56 utilizes GPS technology to determine the location of the electrified vehicle 12. However, other technologies are also contemplated and may be used separately from or in combination with GPS technology.

Next, at block 204, the vehicle system 56 determines whether the driver of the electrified vehicle 12 has exceeded the system regeneration limit when previously at the location identified at block 202. If not, the vehicle control strategy returns to block 202. However, if the driver has previously exceeded the system regeneration limit at the location identified at block 202, the vehicle control strategy 100 can increase lift pedal regeneration at block 206. In this way, the vehicle system 56 can ramp-up lift pedal regeneration in locations where the driver has previously exceeded the system regeneration limit, thereby increasing fuel economy in a manner that is unobtrusive to the driver.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling an electrified vehicle by increasing lift pedal regeneration in response to exceeding a system regeneration limit; and
commanding a torque command signal that is derived from the increased life pedal regeneration to an electric machine to decelerate the electrified vehicle at a desired deceleration rate during a subsequent lift pedal event.

2. The method as recited in claim 1, wherein the controlling step includes incrementally increasing or decreasing the lift pedal regeneration if driver braking behavior meets a predefined criteria.

3. The method as recited in claim 2, wherein the predefined criteria includes whether friction brakes of the electrified vehicle have been applied during a predefined number of key cycles.

4. The method as recited in claim 2, wherein the predefined criteria includes whether the system regeneration limit has been exceeded during a predefined amount of time or predefined number of braking events.

5. The method as recited in claim 1, wherein the controlling step includes:
monitoring a braking event; and
determining whether the system regeneration limit was exceeded during the braking event.

6. The method as recited in claim 5, wherein the determining step includes determining whether friction brakes of the electrified vehicle were applied during the braking event.

7. The method as recited in claim 1, wherein the controlling step includes increasing the lift pedal regeneration only if the increased lift pedal regeneration does not exceed a predefined maximum lift pedal regeneration.

8. The method as recited in claim 1, comprising:
decelerating the electrified vehicle at a first deceleration rate in response to a first lift pedal event; and
decelerating the electrified vehicle at a second deceleration rate that is greater than the first deceleration rate during a second lift pedal event in response to exceeding the system regeneration limit of the electrified vehicle during the first lift pedal event.

9. The method as recited in claim 1, wherein the controlling step includes decreasing the lift pedal regeneration if the system regeneration limit was not exceeded during a predefined amount of time prior to the decreasing step.

10. A method, comprising:
controlling an electrified vehicle by increasing lift pedal regeneration in response to exceeding a system regeneration limit; and
decelerating the electrified vehicle based on the increased lift pedal regeneration during a subsequent lift pedal event.

11. The method, comprising:
controlling an electrified vehicle by increasing lift pedal regeneration in response to exceeding a system regeneration limit, wherein the controlling strp includes incrementally increasing the life pedal regeneration each time the system regeneration limit is exceeded.

12. The method as recited in claim 11, wherein the step of incrementally increasing the lift pedal regeneration includes increasing the lift pedal regeneration by a predefined amount each time the system regeneration limit is exceeded.

13. The method comprising:
determining a location of the electrified vehicle;
determining whether the system regeneration limit was previously exceeded at the location; and
controlling the electrified vehicle by increasing lift pedal regeneration in response to exceeding the system regeneration limit.

14. The method as recited in claim 13, comprising:
performing the controlling step if the system regeneration limit was previously exceeded at the location.

15. A vehicle system, comprising:
an electric machine; and
a control module in communication with said electric machine and configured to increase a negative torque demand commanded to said electric machine in response to exceeding a system regeneration limit during a braking event of said vehicle system, and wherein said control module is configured to decrease said negative torque demand commanded to said electric machine if said system regeneration limit is not exceeded during said braking and a driver braking behavior meets a predefined criteria.

16. The vehicle system as recited in claim 15, comprising an accelerator pedal that communicates a pedal position signal to said control module.

17. The vehicle system as recited in claim 15, comprising a brake pedal that communicates a pedal position signal to said control module.

18. The vehicle system as recited in claim 15, wherein said negative torque demand is derived from a power calculation associated with lift pedal regeneration.

* * * * *

UNITED STATES PATENT AND TRADEMARK OFFICE
CERTIFICATE OF CORRECTION

PATENT NO. : 9,545,849 B2
APPLICATION NO. : 14/491062
DATED : January 17, 2017
INVENTOR(S) : William Paul Perkins It is certified that error appears in the above-identified patent and that said Letters Patent is hereby corrected as shown below:

In the Claims

In Claim 1, Column 9, Line 10; delete "life" and replace with --lift--

In Claim 11, Column 10, Line 10; "The method," should read as --A method,--

In Claim 11, Column 10, Line 13; delete "strp" and replace with --step--

In Claim 11, Column 10, Line 14; delete "life" and replace with --lift--

In Claim 13, Column 10, Line 20; "The method," should read as --A method,--

In Claim 13, Column 10, Line 21; delete "the" and replace with --an--

In Claim 13, Column 10, Line 22; delete "the" and replace with --a--

In Claim 15, Column 10, Line 40; after "breaking" insert --event--

Signed and Sealed this
Ninth Day of May, 2017

Michelle K. Lee
*Director of the United States Patent and Trademark Office*